United States Patent
Gunn et al.

(10) Patent No.: US 7,062,710 B2
(45) Date of Patent: Jun. 13, 2006

(54) FILE TRANSFORMING OUTPUT ENGINE HAVING A DECOMPOSER AND MULTIPLE WRITERS

(75) Inventors: Paul John Gunn, Rochester Hills, MI (US); Yevgeniy O. Vostokov, Troy, MI (US); Alexandr Leonidovici Spac, Chisinau (MD)

(73) Assignee: VMP Mortgage Solutions, Inc., Fraser, MI (US)

( * ) Notice: Subject to any disclaimer, the term of this patent is extended or adjusted under 35 U.S.C. 154(b) by 820 days.

(21) Appl. No.: 10/050,202

(22) Filed: Jan. 16, 2002

(65) Prior Publication Data

US 2003/0172347 A1    Sep. 11, 2003

(51) Int. Cl.
  *G06F 17/00* (2006.01)
(52) U.S. Cl. ..................................... 715/523
(58) Field of Classification Search ................ 715/523, 715/513; 707/200, 101, 104
  See application file for complete search history.

(56) References Cited

U.S. PATENT DOCUMENTS

| | | | |
|---|---|---|---|
| 5,483,653 A * | 1/1996 | Furman ....................... | 707/200 |
| 5,504,891 A | 4/1996 | Motoyama et al. | |
| 5,708,826 A | 1/1998 | Ikeda et al. | |
| 5,745,902 A | 4/1998 | Miller et al. | |
| 5,963,966 A * | 10/1999 | Mitchell et al. ............. | 715/513 |
| 6,003,048 A * | 12/1999 | Fallside ...................... | 715/513 |
| 6,020,970 A | 2/2000 | Erickson et al. | |
| 6,029,181 A | 2/2000 | Milakovich et al. | |
| 6,032,147 A * | 2/2000 | Williams et al. ............. | 707/101 |
| 6,260,043 B1 | 7/2001 | Puri et al. | |
| 6,262,806 B1 | 7/2001 | Hughes | |
| 6,816,277 B1 * | 11/2004 | Kaltenecker et al. ...... | 358/1.15 |

* cited by examiner

*Primary Examiner*—Sanjiv Shah
(74) *Attorney, Agent, or Firm*—Michael Best & Friedrich LLP

(57) ABSTRACT

An output engine operable to convert a file from a first format to a second format. The output engine includes a decomposer that is called by a calling application. The decomposer receives an input file and a desired file format from the calling application. The decomposer decomposes the input file into a component architecture, making the properties of objects within the input file available to other components in the output engine. The output engine also includes a writer that calls the decomposer multiple times to retrieve the component architecture of the file and generate a new version of the file in the second format. The invention also provides a method of delivering a desired file format and an input file to a decomposer. The input file is decomposed into a component architecture in the decomposer and a new version of the input file in the second format is generated by calling the decomposer multiple times from a writer.

30 Claims, 5 Drawing Sheets

FILE TRANSFORMING OUTPUT ENGINE HAVING A DECOMPOSER AND MULTIPLE WRITERS

BACKGROUND OF THE INVENTION

The present invention relates to systems and devices that translate or convert computer files from one format to another. More particularly, the invention relates to systems and devices that convert form and document files from existing formats to xHTML and other tagged or embedded code formats that permit documents to function like database records.

In financial and other industries there are numerous systems used to generate forms and similar documents. For example, within the mortgage lending industry there are a number of loan origination systems, both open-standard and proprietary, that are used to produce different types of documents. For example, VMP Mortgage Forms software is used by a large number of lending institutions for home mortgage and similar transactions. Companies like VMP Mortgage Forms produce mortgage forms for the majority of state and other jurisdictions in the United States. Each jurisdiction may have different legal requirements related to the buying and selling of real estate and the associated loaning of funds to customers. Lending institutions find it more cost effective to use the forms generated by a form company, rather than use their own attorneys to ensure that the documents they use in mortgage transactions comply with the legal requirements of the many jurisdictions in which the lending institutions conduct business.

Most commonly, mortgage and other lending transactions are conducted using paper forms. These forms are printed using loan origination and other financial computer systems. The development of the Internet has led to increased interest in and execution of transactions using electronic forms. In theory, Internet and other available technologies allow financial transactions to be completed without the need to generate any paper documents. However, such ideal systems have not yet been developed.

One problem with current technology is that financial systems produce scores of different types of document file format outputs. Common file formats include .uff, .plc, .rtf, and .pdf. As is known, a file format is the internal structure of a file that defines the way in which the file is stored within a computer system or memory. In addition, a file format may include various control instructions used by application programs and hardware devices.

SUMMARY OF THE INVENTION

The output formats used in current financial systems were selected prior to the birth and influence of the World Wide Web portion of the Internet. In general, these formats are incompatible with Internet requirements. Lender-specific data dictionaries (with attendant data mapping schemes) compound this problem. Internet incompatibility worsens when other file format requirements are considered. These problems are further multiplied by the recordation equipment requirements of more than 3,800 county recorders and 51 state jurisdictions.

Accordingly, there is a need for a file format for financial and other forms that leverages the efficiencies and economies of the Internet. There is also a need for a system and device that converts files in existing formats to an Internet-leveraging file format.

The present invention provides, among other things, an output engine operable to convert a file from a first format to a second format. The output engine includes a decomposer that is called by a calling application. The decomposer receives an input file and a desired file format from the calling application. The decomposer decomposes the input file into a component architecture, making the properties of objects within the input file available to other components in the output engine. The output engine also includes a writer. The writer calls the decomposer multiple times to retrieve the component architecture of the file and generate a new version of the file in the second format.

The output engine may include one or more additional writers. Preferably, each writer is configured to convert the input file to a different format. Each writer is designed to call the decomposer multiple times to retrieve the component architecture of the input file. The writers may be implemented in a chained fashion.

In one embodiment, the decomposer includes a job processor. The job processor is operable to load pages of the file and associate data with each page. The decomposer may include a writer interface and a calling application interface. Each writer may include a job processor interface, a layer processor, a collection processor, and an item processor. The layer, collection, and item processors interact with a stack, which stores components or portions determined by each processor. An output module retrieves the portions from the stack to generate an output file in the new format.

The invention also includes a method of converting an input file from a first format to a second format. The method includes delivering a desired file format and the input file to a decomposer; decomposing the input file into a component architecture in the decomposer; and generating a new version of the input file in the second format by calling the decomposer multiple times from a writer.

The method may also include sending the new version of the input file to a second writer, and generating a new version of the input file in a third format. The input file may be converted from a foreign file format to a common file format before it is converted to the second format.

In another embodiment, the invention provides a method of converting an input file having at plurality of pages and formatted in a first format to an output file formatted in a second format. The method includes receiving a file conversion request from a calling application; receiving the input file; loading each page, one page at a time, in a decomposer; associating data with one or more of the plurality of pages; decomposing objects in each page into a component architecture in a decomposer; driving each page to a writer; and generating the output file by calling the decomposer multiple times from the writer.

In yet another embodiment, the invention provides a file conversion system. The system includes a workstation having a source application, an output engine, and a document manager. The output engine is configured as noted above and includes a decomposer operable to be called by a calling application and to receive a file and a desired file format from the calling application. The decomposer decomposes the file into a component architecture. The system also includes a writer operable to call the decomposer multiple times to retrieve the component architecture of the file and generate a new version of the file in the second format. The workstation accesses a form data database and a form database and is coupled to a server that has a document control and production engine.

As is apparent from the above, it is an advantage of the present invention to provide a system that converts files from one format to another. Other features and advantages of the present invention will become apparent by consideration of the detailed description and accompanying drawings.

DETAILED DESCRIPTION

Figure 1:
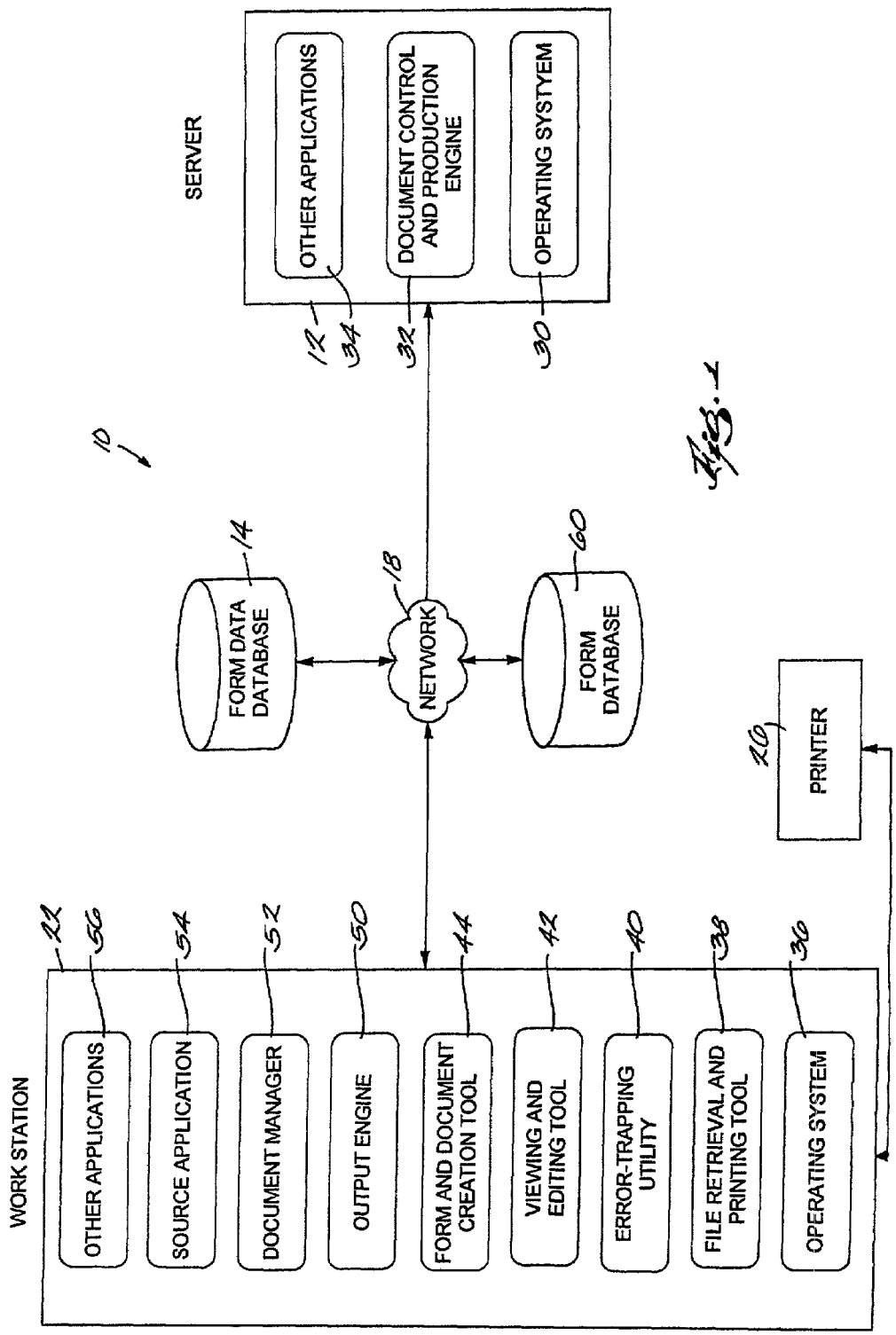
FIG. 1 is a schematic diagram of an exemplary system and suite of software tools used to create, view, edit, and print forms.

Before embodiments of the invention are explained in detail, it is to be understood that the invention is not limited in its application to the details of the construction and the arrangements of the components set forth in the following description or illustrated in the drawings. The invention is capable of other embodiments and of being practiced or being carried out in various ways. Also, it is to be understood that the phraseology and terminology used herein is for the purpose of description and should not be regarded as limiting. Furthermore, it is assumed that the reader is familiar with Windows programming and COM architecture.

FIG. 1 illustrates a system 10 that includes a server 12, a form data database 14, a network 18, a workstation 22, and a printer 26. The server 12 is coupled to the network 18 and includes an operating system 30 and a document control and production engine 32. The server may include other applications 34, such as standard communications software that, for purpose of brevity, are not discussed herein. The workstation 22 includes an operating system 36, a file retrieval and printing tool 38, an error-trapping utility 40, a viewing and editing tool 42, a form and document creation tool 44, an output engine 50, a document manager 52, and a source application 54. The workstation 22 may also include other applications 56 not directly pertinent to the invention. The server 12 communicates with the workstation 22 via the network 18. The source application 54 has access to or interacts with the form data database 14 to supply form data for the document manager 52. The form data database 14 may include a variety of information such as mortgagee name, address, loan amount, Social Security number, and other information. The exact type and extent of information stored in the form data database 14 depends upon the specific types of forms and documents to be created using the system 10 and is not limited to mortgage or other financial transaction data.

Some of the components of the system 10 may be implemented using currently available software. Table 1, below, sets out the names of components of the exemplary workstation 22 and commercially available products that are suitable for use as those components.

TABLE 1

| Component | Commercially Available Product |
|---|---|
| Operating system 36 | MS Windows Operating Systems |
| File retrieval and printing tool 38 | SeaReach component of I-32 ActiveX Server from CBF Systems, Inc. |
| Error-trapping utility 40 | Jetsam component of I-32 ActiveX Server from CBF Systems, Inc. |
| Viewing and editing tool 42 | Spyglass component of I-32 ActiveX Server from CBF Systems, Inc. |
| Form and document creation tool 44 | LanYard component of I-32 ActiveX Server from CBF Systems, Inc. |
| Document manager 52 | Client component of Rākis document control and production software from CBF Systems, Inc. |

In the embodiment described, the source application 54 is, more precisely, a set of information stored in a Rākis runtime database. The runtime database is an open database connectivity ("ODBC") compliant database. The set of information provides the mapping between the database and common desktop environment ("CDE") base elements in the Rākis software.

Components of the server 12 may be implemented using commercially available software. Microsoft Windows operating system software may be used for the operating system 30. The server component of the Rākis document control and production software noted in Table 1 may be used for the document control and production engine 32. The database 14 may be implemented with any database that supports SQL queries and ODBC.

In general terms, the system 10 may be used to create new forms, or to modify or edit existing forms which may be available from a database such as a form database 60. Forms may include a number of blanks or data fields that may be populated with data from the form data database 14. The document manager 52 is used to access the document control and production engine 32. The document control and production engine 32 uses the source application 54 to create, modify, or edit forms, as is necessary. Resulting files may be printed on the printer 26.

Figure 2:
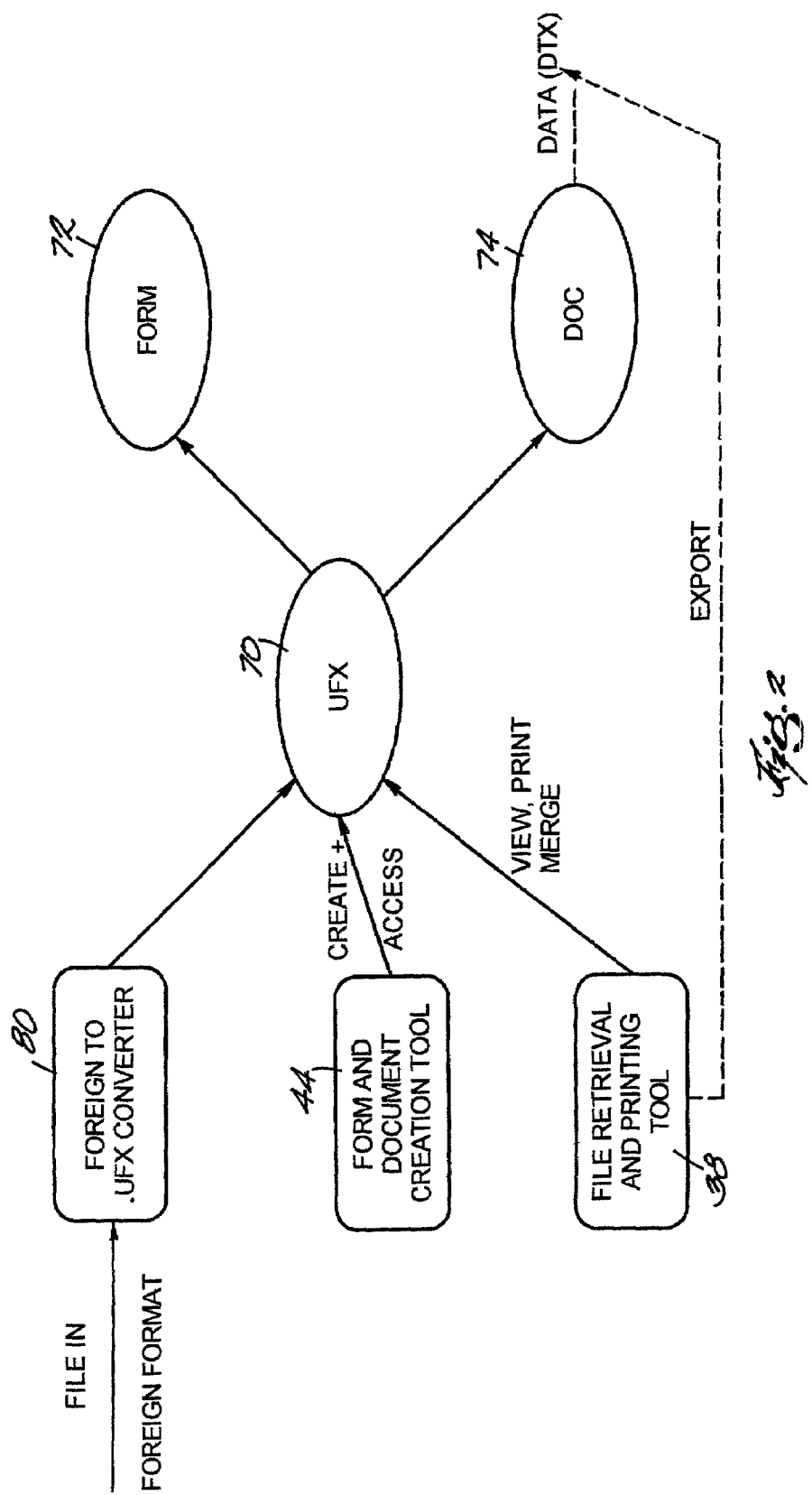
FIG. 2 is a schematic diagram illustrating a file in a first format, components of that file, and tools used to create that file.

For the example thus far illustrated and discussed, files created in the system 10 are formatted in a .ufx format. FIG. 2 schematically illustrates an exemplary .ufx file 70. Files in the .ufx format may include forms with empty data fields, such as form 72. Form 72 is formatted in a .uff format. uff refers to "universal file format." .ufx refers to a .uff file merged with data from a .dtx file, hence .ufx. For the purposes of the discussion herein, populated forms are referred to as "documents." FIG. 2 illustrates an exemplary document 74.

FIG. 2 also illustrates that files in non-.ufx formats may be converted to a .ufx format using a converter 80. Birchski file conversion software available from CBF Systems, Inc. is suitable for use as the converter 80. Birchski software has the capabilities to transform .rtf, .afp, and other files types into .uff or .ufx files. In general terms, the converter 80 provides a mechanism for converting files in foreign or disparate file formats into a common file format which may then be converted into an Internet leveraging file format, as will be discussed further herein.

FIG. 2 also illustrates that the file retrieval and printing tool 38 can be used to export data files (which are .dtx files for the embodiment described). As noted above, form files merged or populated with data from .dtx files are referred to as documents.

Figure 3:
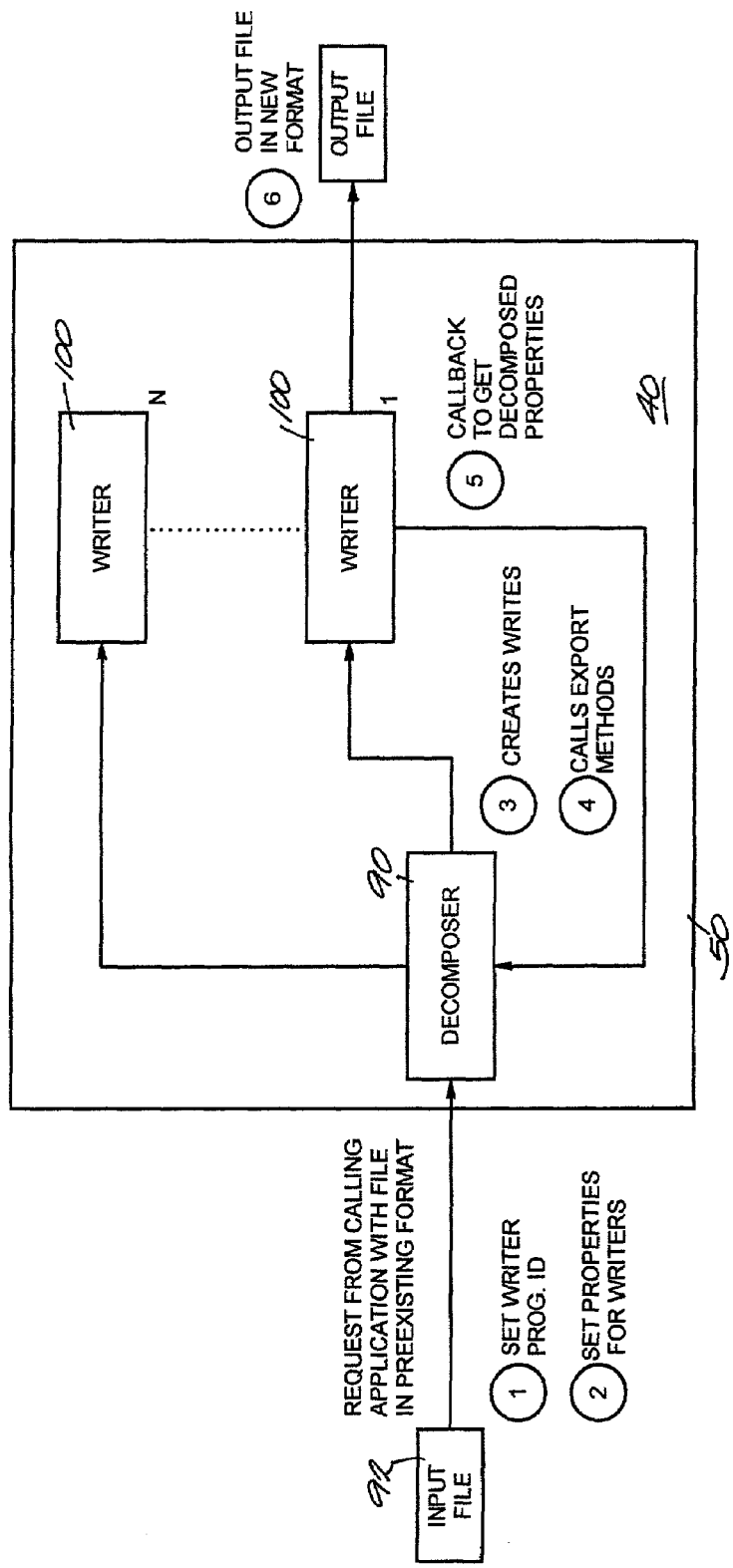
FIG. 3 is a block diagram of an output engine having a decomposer and multiple writers.

FIG. 3 illustrates the output engine 50 in greater detail. In the embodiment shown, the output engine 50 is implemented in software and the software is written in Visual C++. Further, the software is constructed using Microsoft's component object model ("COM") architecture. As should be understood by those of ordinary skill in the art, COM defines a structure for building objects that can be called and executed in the Windows operating system. COM provides an interface between objects and distributed COM ("DCOM") allows objects to be executed remotely.

The output engine 50 includes a decomposer 90. The decomposer receives requests from a calling application, such as the document manager application 52. In general terms, the request sent to the output engine 50 is a solicitation to convert a file in a first format, such as .ufx, to a second format, such as xHTML. In other words, the output engine 50 converts a file from a standard or pre-existing format to an Internet-leveraging format.

In addition to receiving a conversion request from a calling application, the decomposer 90 also receives a file in a pre-existing format, such as input file 92. The request from the calling application includes a number of parameters that are used to set data attributes or properties of several writers 100 in the output engine 50. One such property is a writer ProgID. (As is known, a program ID or "ProgID" is a human-readable name that identifies a class. This name or string is placed in the system registry.) The writer ProgID identifies which of the several writers 100 will be used in the conversion of the input file 92 from one format to another. In one embodiment, the output engine 50 includes three writers 100: a generalized xHTML writer, a specialized xHTML writer (such as a writer configured to produce files in the electronic format designated by FannieMae), and a second specialized writer. The second specialized writer may be a writer configured to produce files in a proprietary format such as the iLumin format. The iLumin format is designed for use in digital signing rooms.

The decomposer 90 loads each page of a form or document within the input file 92, one page at a time. The decomposer 90 also associates data with each page of the input file, if any, by calling export methods. The decomposer 90 also drives each page to an appropriate writer (as identified by the writer ProgID). As will be discussed further below, the decomposer 90 decomposes the properties of the file being converted to a new format and makes those decomposed properties available to the writers 100.

The writers 100 may be executed in a chained fashion. For example, the base xHTML writer may be executed to create an xHTML file. That file may then be sent to the Fannie Mae writer for conversion to the Fannie Mae format, which currently is a specialized xHTML format. After the writers have completed processing, a final output file, such as file 102 is generated. Even though each writer is designed to generate an output file in a specific format, the overall architecture of each writer is similar.

One advantage of the output engine 50 as compared to prior format conversion tools lies in the separation of the decomposer 90 from the writers 100. The output engine 50 is configured such that the subject writer does not need to know the details about the form or document in the input file 92. The pertinent writer only needs to know what objects are within the file and the end format desired (the syntax and semantics of the desired format). Further, the decomposer 90 does not need to know the details about the end format. The division of labor or functionality in the invention provides an architecture where writers can be readily added, modified, or deleted as needed depending on the number of end file formats required by the user.

Figure 4:
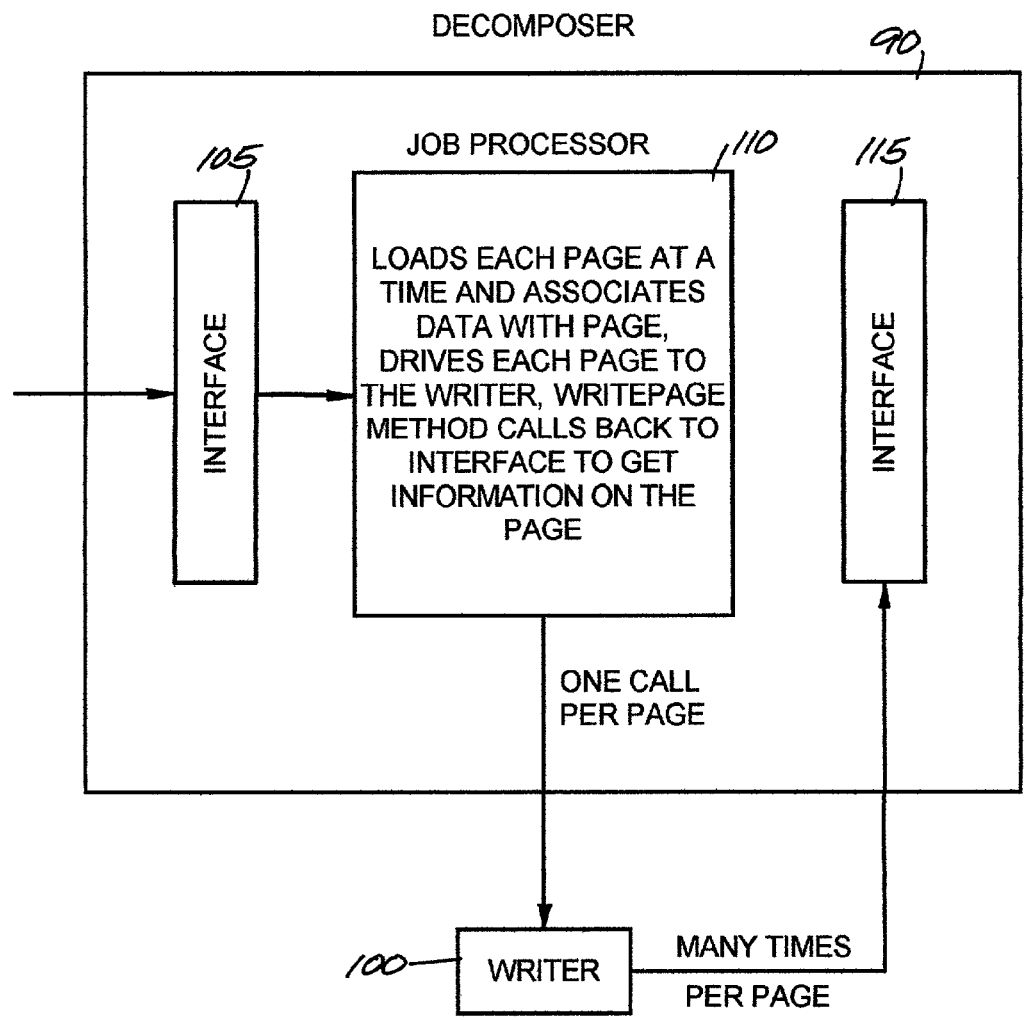
FIG. 4 is a block diagram of a decomposer.

FIG. 4 illustrates the decomposer 90 in greater detail. The decomposer 90 includes a first or calling application interface 105, a job processor 110, and a second or writer interface 115. The calling application interface 105 facilitates information exchange between the output engine 50 and the calling application. Properties for an exemplary calling application interface 105 are set out in Table 2.

TABLE 2

| | |
|---|---|
| DefaultDestinPath | String |
| The Default Path For Destination Files | |
| Version | Long (R) |
| The Current Software Version | |
| WriterID | String |
| The progid of the Writer component | |

Methods suitable for use with the properties set out in Table 2 include the following:

```
ClearData
Clear Data
   Sub ClearData( )
ClearForm
Clear Form
   Sub ClearForm( )
clearWriterProperties
Clear The Writer Property Bag
   Sub clearWriterProperties( )
EndExport
End export
   Sub EndExport( )
Export
Form or Doc to the Destination File
   Sub Export( )
LoadData
Load Date
   Sub LoadData (ByVal LanDoc As Object,
   UserAuthString As Variant,
   AdminAuthString As Variant)
LoadForm
Load Form
   Sub LoadForm (ByVal LanForm As Object)
setWriterProperty
Set The Writer Property Bag
   Sub setWriterProperty (ByVal name As String, ByVal value As String)
StartExport
Start export
   Sub StartExport (ByVal FileNameDestin As
   String)
```

The job processor 110 performs the main functions of the decomposer 90, which as noted above, include loading, a page at a time, each page of a form or document within the input file 92 and associating data, if any is applicable, with each page. The job processor 110 also drives each page to the subject writer 100. The subject writer 100 calls the writer interface 115 many times per page. The writer interface 115 provides file properties to the writer. The properties are generated by decomposing each object in an input file into its component parts. This decomposition may be performed in the job processor 110 using commercially available software distributed by CBF Systems, Inc. under the name Monsoon. The interface 115 provides an object model of each .uff and .cdd ("custom data descriptor") file.

A type library for an exemplary writer interface 115 is set out below. Table 3 includes properties for the writer interface.

TABLE 3

| | | | |
|---|---|---|---|
| Alignment (Alignment as Integer) | HRESULT (R) | LineCount (LineCount As Integer) | HRESULT (R) |
| AreaBottom (Bottom As Long) | HRESULT (R) | LineIndex (ByVal LineNumber As Integer, TextIndex As Integer) | HRESULT (R) |
| AreaEndOffset (EndOffset As Long) | HRESULT (R) | LineLength (ByVal LineNumber As Integer, Line Length As Integer) | HRESULT (R) |
| AreaLeft (Left As Long) | HRESULT (R) | LinePosX (ByVal LineNumber As Integer, LinePosX As Long) | HRESULT (R) |
| AreaRight (Right As Long) | HRESULT (R) | LinePosY (ByVal LineNumber As Integer, Line) | HRESULT (R) |
| AreaStartOffset (StartOffset As Long) | HRESULT (R) | LineStatus (ByVal LineNumber As Integer, Line Status As slLineStatusEnum) | HRESULT (R) |
| AreaTop (Top As Long) | HRESULT (R) | LineWidth (ByVal LineNumber As Integer, Line Width as Long) | HRESULT (R) |
| BrushColor (Color As Long) | HRESULT (R) | PageHeight (Height As Long) | HRESULT (R) |
| BrushHatch (Hatch As monBrushhatchEnum) | HRESULT (R) | PageNumber (PageNumber As Long) | HRESULT (R) |
| BrushStyle (Style As monBrushstyleEnum) | HRESULT (R) | PageUnits (PageUnits As Long) | HRESULT (R) |
| Color (Color As Long) | HRESULT (R) | PageWidths (Width As Long) | HRESULT (R) |
| DataID (DataID As Integer) | HRESULT (R) | PenColor (Color As Long) | HRESULT (R) |
| Description (Description As String) | HRESULT (R) | PenStyle (Style As monPenstyleEnum) | HRESULT (R) |
| DesignHeight (DesignHeight As Integer) | HRESULT (R) | PenWidth (Width As Long) | HRESULT (R) |
| DesignWidth (DesignWidth As Integer) | HRESULT (R) | Position (Position As Integer) | HRESULT (R) |
| DocName (DocName As String) | HRESULT (R) | RawData (ByVal DataID As Integer, Text As String) | HRESULT (R) |
| EndX (EndX As Long) | HRESULT (R) | RoundingX (RoundX As Long) | HRESULT(R) |
| EndY (EndY As Long) | HRESULT (R) | RoundingY (RoundY As Long) | HRESULT (R) |
| FirstLineTop (LineTop As Long) | HRESULT (R) | ShadowColor (Color As Long) | HRESULT (R) |
| FontAscent (Ascent As Long) | HRESULT (R) | StartX (StartX As Long) | HRESULT(R) |
| FontCPointSize (CPointSize As Integer) | HRESULT (R) | StartY (StartY As Long) | HRESULT (R) |
| FontFaceName (FaceName As String) | HRESULT (R) | TabSpace (TabSpace As Long) | HRESULT (R) |
| FontID (FontID As Integer) | HRESULT (R) | Text (TextString As String) | HRESULT (R) |
| FontRange (ByVal Start As Integer, End As Integer) | HRESULT (R) | WriterUnits (Units As Long) | HRESULT (R) |
| FontSet (FontSetName As String) | HRESULT (R) | | |
| ItemsCount (Count As Long) | HRESULT (R) | | |
| LayersCount (Count As Long) | HRESULT (R) | | |
| Leading (Leading As Long) | HRESULT (R) | | |
| FontStyle (Style As Integer) | HRESULT (R) | | |
| FontWeight (Weight As Integer) | HRESULT (R) | | |
| FontWidths (ByVal Character As Integer, Width As Long) | HRESULT (R) | | |
| FormName (FormName As String) | HRESULT (R) | | |

Exemplary Methods suitable for use with the writer interface 115 defined using the properties in Table 3 are listed below.

```
ExportToPCL
    Function ExportToPCL (ByVal FileName As String)
        As HRESULT
ExportValue
    Function ExportValue (ByVal FileName As String)
        As HRESULT
GetMetaData
    Function GetMetaData (ByVal MetaName As String,
        pDoc As Object) As HRESULT
getWriterProperty
    Function getWriterProperty (ByVal name As
        String, value As String) As HRESULT
PopCurrentObjectID
    Function PopCurrentObjectID ( ) As HRESULT
PushCurrentObjectID
    Function PushCurrentObjectID ( ) As
        HRESULT
setCurrentCollection
    Function setCurrentCollection (ByVal
        ObjectType As slObjectTypeEnum) As HRESULT
setCurrentItem
    Function setCurrentItem (ByVal Index As
        Long) As HRESULT
setCurrentLayer
    Function setCurrentLayer (ByVal Layer As
        Long) As HRESULT
```

Figure 5:
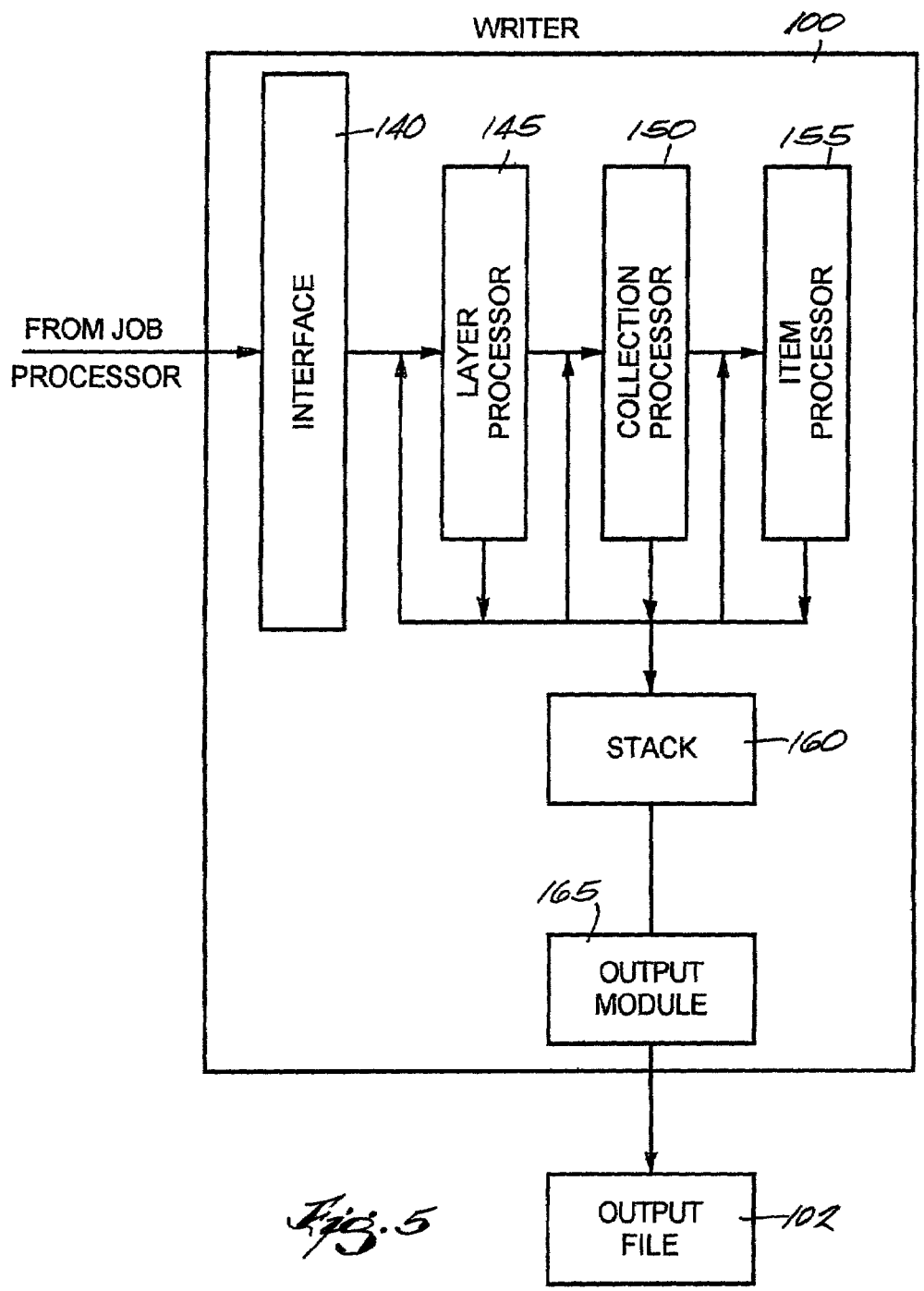
FIG. 5 is a block diagram of a writer.

FIG. 5 illustrates an exemplary writer 100 in additional detail. The writer illustrated includes a job processor interface 140, a layer processor 145, a collection processor 150, an item processor 155, a stack 160, and output module 165.

The interface 140 facilitates communication between the writer 100 and the job processor 110. A type library for an exemplary job processor interface 140 is set out below. Properties for the job processor interface 140 are listed in Table 4.

TABLE 4

| SkylonInterface | | IskylonForWriter (W) |
|---|---|---|
| The Skylon Interface | | |
| Version (Version As Long) | The Current | HRESULT (R) |
| Writer Version | | |

Methods suitable for use with the job processor interface 140 include the following:

BeginWrite

```
Begin to Write Output File
    Function BeginWrite (ByVal FileName
    As String) As HRESULT
EndWrite
End to Write Output File
    Function EndWrite ( ) As HRESULT
WritePage
Write Output File
    Function WritePage ( ) As HRESULT
```

The interface 140 provides information to the three processors 145, 150, and 155. Processors 145, 150, and 155 are configured in a nested loop. As noted, the files processed by the exemplary embodiment discussed thus far represent forms. These forms may be structured in layers: a base layer and one or more overlays. In the example discussed, .cdd files are used to add layers of information to a form. Each layer has a number of collections and each collection has a number of different items. As each portion of a page is processed, layers, collections, and items are identified and determined. As each layer, collection, and item is determined, the determined materials or portions are pushed onto the stack 160. The output module 165 assembles each determined portion in the order needed, as determined by the output format set up by the calling application. The compiled components make up the output file generated by the output engine 40. The output file is in a different format then the input file, preferably an Internet leveraging file format.

As can be seen from the above, the present invention provides an output engine with a decomposer and one or more writers that converts a file in a first format to a file in a second format.

Various features and advantages of the invention are set forth in the following claims.

What is claimed is:

1. An output engine operable to convert a file from a first format to a second format, the output engine comprising:
    a decomposer operable to be called by a calling application and to receive a file and a desired file format from the calling application, the decomposer operable to decompose the file into a component architecture; and
    a writer operable to call the decomposer multiple times to retrieve the component architecture of the file and generate a new version of the file in the second format.

2. An output engine as claimed in claim 1, further comprising a second writer operable to call the decomposer multiple times to retrieve the component architecture of the file and generate a new version of the file in a third format.

3. An output engine as claimed in claim 1, wherein the decomposer includes a job processor.

4. An output engine as claimed in claim 3, wherein the job processor is operable to load pages of the file and associate data with each page.

5. An output engine as claimed in claim 3, wherein the decomposer includes a writer interface.

6. An output engine as claimed in claim 5, wherein the decomposer includes a calling application interface.

7. An output engine as claimed in claim 3, wherein the writer includes a job processor interface.

8. An output engine operable to convert a file from a first format to a second format, the output engine comprising:
    a decomposer operable to be called by a calling application and to receive a file and a desired file format from the calling application, the decomposer operable to decompose the file into a component architecture and make the component architecture available to a writer, the component architecture including objects included in the file; and
    a writer operable to call the decomposer multiple times to retrieve the objects included in the file and generate a new version of the file in the second format, wherein the writer includes a layer processor, a collection processor, and an item processor.

9. An output engine as claimed in claim 8, wherein the writer includes a stack and an output module.

10. A method of converting an input file from a first format to a second format, the method comprising:
    delivering a desired file format and the input file to a decomposer;
    decomposing the input file into a component architecture in the decomposer, the component architecture including properties of objects included in the input file;
    making the component architecture available to a writer; and
    generating a new version of the input file in the second format by calling the decomposer multiple times from a writer to obtain the properties of the objects included in the input file.

11. A method of converting an input file as claimed in claim 10, the method further comprising:
    sending the new version of the input file to a second writer; and
    generating a new version of the input file in a third format.

12. A method of converting an input file as claimed in claim 10, the method further comprising converting the input file from a fourth format to a common file format prior to delivering the input file to a decomposer.

13. A method of converting an input file having a plurality of pages and formatted in a first format to an output file formatted in a second format, the method comprising:
    receiving a file conversion request from a calling application;
    loading each page of the input file, one page at a time, in a decomposer;
    associating data with one or more of the plurality of pages;
    decomposing objects in each page into a component architecture, the component architecture including properties of objects included in the input file;
    making the component architecture available to a writer;
    driving each page to a writer; and
    generating the output file by calling a decomposer multiple times from a writer in order to obtain the properties of objects included in the input file.

14. A method as claimed in claim 13, further comprising: executing a plurality of writers in a chained fashion.

15. A method as claimed in claim 13, further comprising sending the output file to a second writer; and
generating a new version of the output file in a third format.

16. A method of converting an input file having a plurality of pages and formatted in a first format to an output file formatted in a second format, the method comprising:
receiving a file conversion request from a calling application;
loading each page of the input file, one page at a time, in a decomposer;
associating data with one or more of the plurality of pages;
determining layers, collections, and items in each page;
pushing the determined layers, collections, and items onto a stack;
decomposing objects in each page into a component architecture, the component architecture including properties of objects included in the input file;
making the component architecture available to a writer;
driving each page to a writer;
assembling the determined layers, collections, and items into the output file; and
generating the output file by calling a decomposer multiple times from a writer in order to obtain the properties of objects included in the input file.

17. A file conversion system comprising:
a workstation having a source application, an output engine, and a document manager, the output engine including
a decomposer operable to be called by a calling application and to receive a file and a desired file format from the calling application, the decomposer operable to decompose the file into a component architecture, the component architecture including properties of objects included in the file; and
a writer operable to call the decomposer multiple times to retrieve the properties of the objects included in the file and generate a new version of the file in the second format,
a form data database and a form database, each accessible to the workstation; and
a server accessible to the workstation and having a document control and production engine.

18. A system as claimed in claim 17, wherein the output engine further comprises a second writer operable to call the decomposer multiple times to retrieve the component architecture of the file and generate a new version of the file in a third format.

19. A system as claimed in claim 17, wherein the decomposer includes a job processor.

20. A system as claimed in claim 19, wherein the job processor is operable to load pages of the file and associate data with each page.

21. A system as claimed in claim 19, wherein the decomposer includes a writer interface.

22. A system as claimed in claim 21, wherein the decomposer includes a calling application interface.

23. A system as claimed in claim 19, wherein the writer includes a job processor interface.

24. A system as claimed in claim 17, further comprising a converter accessible to the workstation and operable to convert files from a foreign format to a common format.

25. A file conversion system comprising:
a workstation having a source application, an output engine, and a document manager, the output engine including
a decomposer operable to be called by a calling application and to receive a file and a desired file format from the calling application, the decomposer operable to decompose the file into a component architecture, the component architecture including objects included in the file; and
a writer operable to call the decomposer multiple times to retrieve the objects included in the file and generate a new version of the file in the second format, the writer including a layer processor, a collection processor, and an item processor,
a form data database and a form database, each accessible to the workstation; and
a server accessible to the workstation and having a document control and production engine.

26. A system as claimed in claim 24, wherein the writer includes a stack and an output module.

27. A method of converting an input file from a first format to a second format, the method comprising:
delivering a desired file format and the input file to a decomposer;
decomposing the input file into a component architecture in the decomposer;
generating at least one data file, the at least one data file representing an aspect of a document;
generating an object model for the at least one data file, the object model having one or more objects;
making the object model for the at least one data file available to a writer; and
generating a new version of the input file in the second format by calling the decomposer multiple times from a writer.

28. A method as claimed in claim 27, further comprising:
delivering a writer identifier to the decomposer;
selecting a writer based on the writer identifier; and
making the object model for the at least one data file available to the selected writer.

29. A method as claimed in claim 27, wherein the input file includes a plurality of pages and the method further comprises loading each page of the input file and associating data with each page in a job processor.

30. An output engine operable to convert a file from a first format to a second format, the output engine comprising:
a decomposer operable to be called by a calling application and to receive, from the calling application, a file, a desired file format, and a set of parameters used to set properties of a plurality of writers, the decomposer operable to decompose the file into a component architecture; and
a plurality of writers, each writer having an identifier and configured to be selected according to at least one of the set of parameters used to set properties of a plurality of writers, and to call the decomposer multiple times to retrieve the component architecture of the file and generate a new version of the file in the second format.

* * * * *